No. 778,215. Patented December 27, 1904.

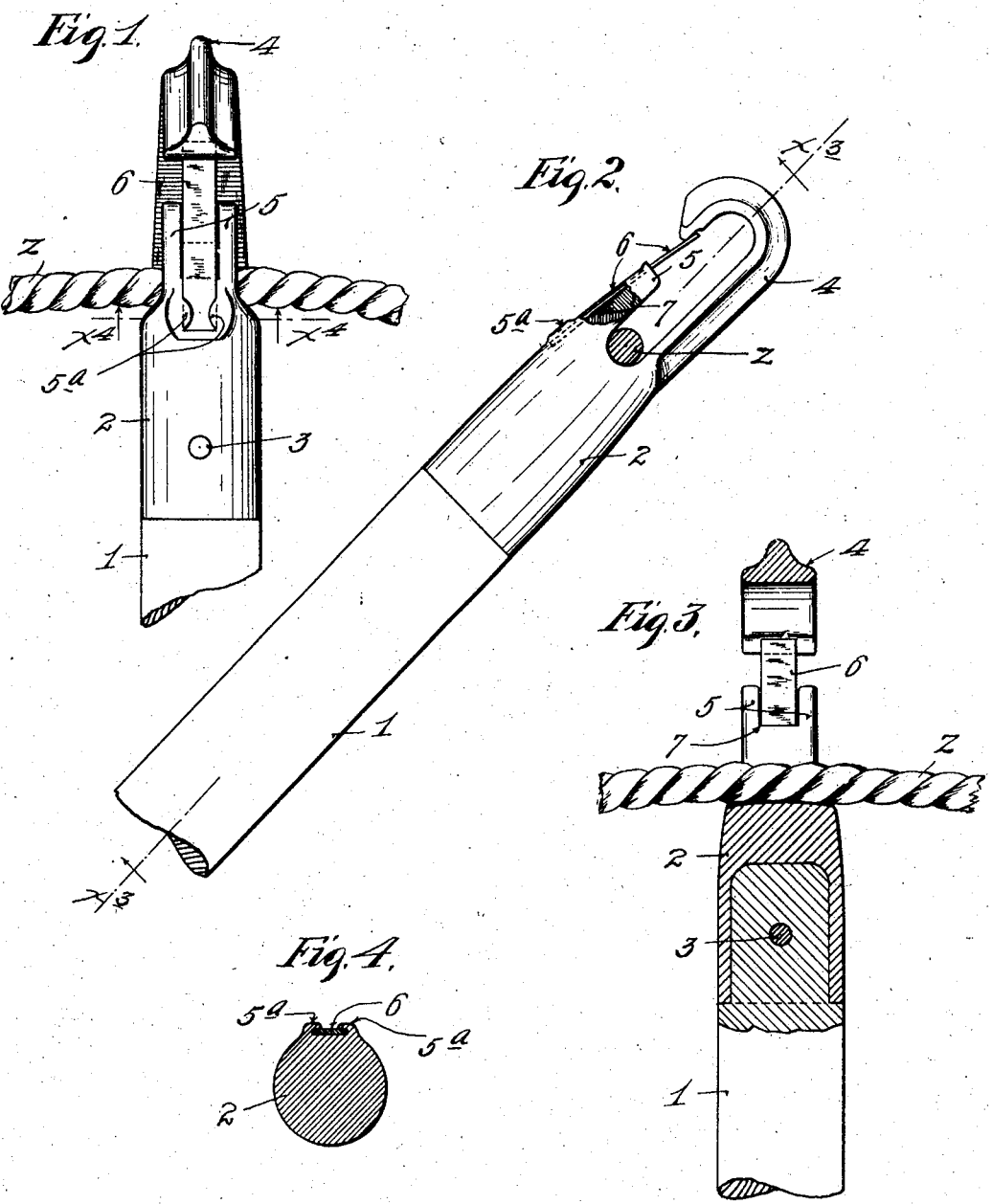

UNITED STATES PATENT OFFICE.

HICKSON O. BRECKENRIDGE, OF BIGSTONE, SOUTH DAKOTA.

CLOTHES-LINE POLE OR SUPPORT.

SPECIFICATION forming part of Letters Patent No. 778,215, dated December 27, 1904.

Application filed November 9, 1903. Serial No. 180,337.

*To all whom it may concern:*

Be it known that I, HICKSON O. BRECKENRIDGE, a citizen of the United States, residing at Bigstone, in the county of Grant and State of South Dakota, have invented certain new and useful Improvements in Clothes-Line Poles or Supports; and I do hereby declare the following to be a full, clear, and exact description of the invention, such as will enable others skilled in the art to which it appertains to make and use the same.

My invention has for its object to provide an improved clothes-line pole or support; and to this end it consists of the novel devices and combinations of devices hereinafter described, and defined in the claim.

The invention is illustrated in the accompanying drawings, wherein like characters indicate like parts throughout the several views.

Figure 1 is a front elevation of the upper end of a clothes-line pole, the same being provided with a snap-hook and crotch for engagement with the clothes-line in accordance with my invention. Fig. 2 is a side elevation of the parts shown in Fig. 1, and Fig. 3 is a section on the line $x^3$ $x^3$ of Fig. 2. Fig. 4 is a section on the line $x^4$ $x^4$ of Fig. 1.

The numeral 1 indicates the clothes-line pole, and the numeral 2 indicates a socket which is rigidly secured to the upper end thereof by a rivet 3 or other suitable device. The socket 2 is formed with a hook extension 4 and a bifurcated lug 5, that extends approximately in line with the end of the hook 4. A leaf-spring or spring-tongue 6 is rigidly secured at its lower end to the upper portion of the socket in line with the lug 5 and normally engages at its free end with the end of the hook 4 to close the rope-passage between the ends of the said hook and of the said lug. The hook and socket 2 are preferably of malleable iron, and, as shown, the spring is secured to the socket 2 by upset portions $5^a$ thereof and pounding the said portions $5^a$ over onto the lower end of said spring, as best shown in Fig. 4.

It will be noted that the lug 5 is cut away at 7 (see Fig. 3) in line with the spring-tongue 6, so that when the free end of the said tongue is forced inward the body of the said tongue may pass between the bifurcated ends or prongs of the lug 5. It will be further noted that the said lug 5 coöperates with the lower portion of the hook 4 to afford a crotch which will receive the rope $z$ and support the same out of contact with and independently of the spring-tongue. The spring-tongue, however, will of course effectually prevent the clothes-line or rope from jumping out of the crotch of the hook. It is therefore evident that a clothes-line supported by a pole equipped with one of my improved hooks can be blown or thrown about without being disengaged therefrom. This is very important, since clothes hung on a line are very frequently dropped to the ground and soiled, due to the fact that the line has been blown loose from its supporting-pole.

The device described, while of small cost, has in practice been found extremely efficient for the purposes had in view.

What I claim, and desire to secure by Letters Patent of the United States, is as follows:

The combination with a line-supporting pole, of a socket 2, having a bifurcated lug 5 and hook 4, the ends of said lug and hook being spaced apart to form a lateral entrance-passage, of the spring-tongue 6 secured to the base of said lug 5, and working between the prongs of said lug, with its free end engaged with the end of said hook, substantially as described.

In testimony whereof I affix my signature in presence of two witnesses.

HICKSON O. BRECKENRIDGE.

Witnesses:
GEO. K. CLARK,
HENRY G. MOORE.